United States Patent [19]

Paradis

[11] Patent Number: 5,459,959
[45] Date of Patent: Oct. 24, 1995

[54] FISH STRIKE INDICATOR COMPOSITION

[76] Inventor: Daniel L. Paradis, 3020 San Ramon Dr., Meridian, Id. 83642

[21] Appl. No.: 172,874

[22] Filed: Dec. 22, 1993

[51] Int. Cl.$^6$ ................................................ A01K 95/00
[52] U.S. Cl. ........................................ 43/44.89; 43/44.91
[58] Field of Search ............................... 43/44.89, 44.91

[56]  References Cited

U.S. PATENT DOCUMENTS

| | | | |
|---|---|---|---|
| 3,638,347 | 2/1972 | Kochevar | 43/44.89 |
| 4,780,981 | 11/1988 | Hayward | 43/44.89 |
| 4,910,908 | 3/1990 | Rosenberg | 43/44.89 |
| 5,155,138 | 10/1992 | Lundqvist | 521/140 |
| 5,202,362 | 4/1993 | Hermele | 521/218 |

FOREIGN PATENT DOCUMENTS

| | | | |
|---|---|---|---|
| 2048631 | 12/1980 | United Kingdom | 43/44.89 |
| 2156357 | 10/1985 | United Kingdom | 43/44.91 |

*Primary Examiner*—P. Austin Bradley
*Assistant Examiner*—James Miner
*Attorney, Agent, or Firm*—Frank J. Dykas

[57]  ABSTRACT

The invention is a moldable, buoyant composition comprising sugar, resin and EXPANCEL® microspheres, or the like. When the unexpanded microspheres are heated, they expand to increase their volume about 50 times. Blends of 2–10 parts microspheres to 100 parts sugar and resin result in expanded compositions with densities of from about 0.20 g/cc to about 0.35 g/cc. A convenient way to expand the blend is to place it in a conventional microwave oven at a "high" setting for from about 15 to about 60 seconds. The result is a low density, moldable putty which may be colored with fluorescent pigments and wrapped around a fishing line to make a highly visible fish strike indicator. Hydrophobic silica may be added to the composition to further increase its hydrophobicity.

3 Claims, 1 Drawing Sheet

FISH STRIKE INDICATOR COMPOSITION

BACKGROUND OF THE INVENTION

1. Technical Field

This invention relates to buoyant compositions of matter useful as fish strike indicators, or "bobbers", for fishing lines.

2. Related Art

ORVIS® Company, Manchester, Vt., sells its "Strike Putty #835L", a buoyant material that can be molded to a fishing line leader, and which the Company describes as "clay like". This material, containing glass microballoons and hydrocarbon resins, has a minimum density of about 0.6 g/cc, and tends to absorb water, making it less buoyant after prolonged or repeated use. Therefore, there is still a need in the fishing industry for a moldable composition for fish strike indicators which has low density and low water absorption characteristics.

DISCLOSURE OF INVENTION

The invention is a moldable, buoyant composition comprising sugar, resin and EXPANCEL® microspheres, or the like which are expandable when subjected to microwave energy. When the unexpanded microspheres are heated, they expand to increase their volume about 50 times. Blends of 2–10 parts microspheres to 100 parts sugar and resin result in expanded compositions with densities of from about 0.20 g/cc to about 0.35 g/cc. A convenient way to expand the blend is to place it in a conventional household microwave oven at a "high" setting for from about 15 to about 60 seconds. The result is a low density, moldable putty which may be colored with fluorescent pigments and wrapped around a fishing line to make a highly visible fish strike indicator. Hydrophobic silica may be added to the composition to further increase its hydrophobicity.

BEST MODE FOR CARRYING OUT INVENTION

Figure 1:
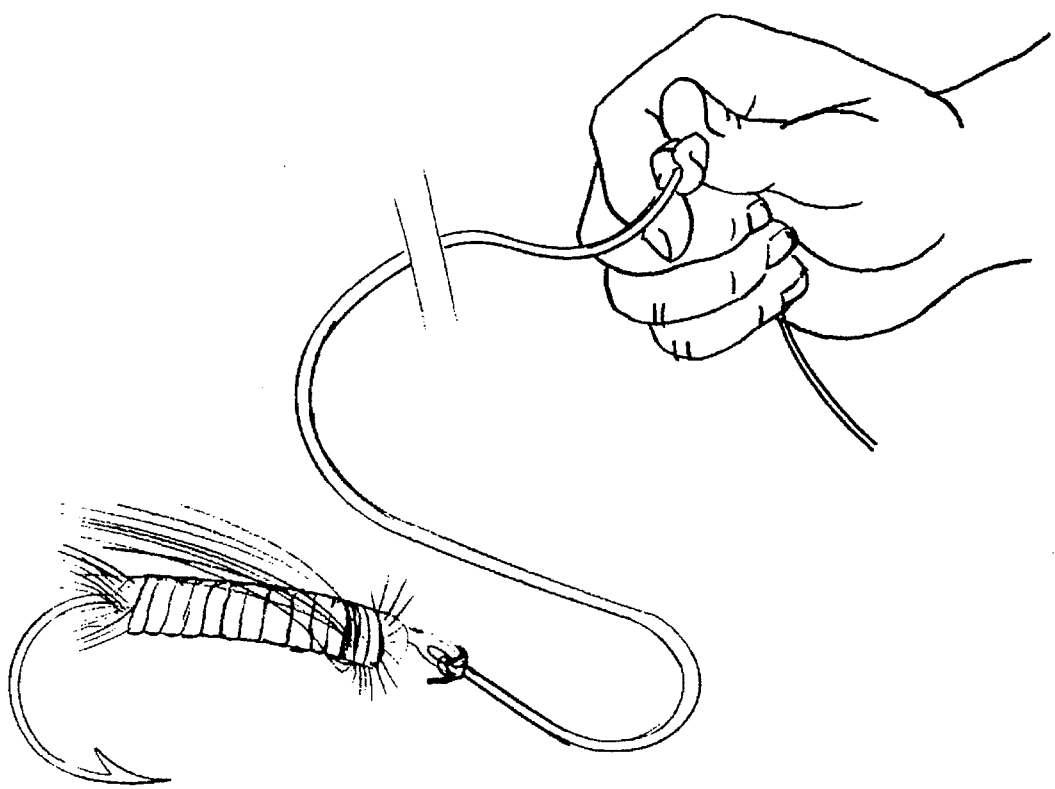
FIG. 1 is a partial, detail view showing a fish strike indicator of this invention being applied to a fishing line.
Figure 2:
FIG. 2 is a partial, detail view showing a fish strike indicator of this invention on a fishing line floating in the water.

My moldable, buoyant composition contains sugar, resin and EXPANCEL® microspheres, or the like which are expandable when subjected to microwave energy. By "moldable" I mean malleable or capable of undergoing plastic deformation by hand without fracture or rupture at temperatures from about −10° to 50° C. By "buoyant" I mean capable of floating on water. By "expandable" I mean capable of increasing volume. By "microwave energy" I mean electromagnetic waves with wavelengths of from about 1 mm to about 30 cm.

For the sugar component, I use common granulated sugar like sucrose, glucose, fructose and dextrose. I prefer ordinary, table corn syrup, which is a complex sugar high in dextrose, because it is easy to store, handle and mix. The sugar component will comprise between about 20–80 wt. %, preferably 30–60 wt. %, of the final product.

For the resin component, I use tree resins like gum turpentine, or lower molecular weight resins produced by polymerization and hydrogenation of monomer hydrocarbon feedstocks. I prefer REGALREZ® 1018 resin available from Hercules, Inc., Wilmington, Del. The resin component will also comprise between about 20–80 wt. %, preferably 30–60 wt. %, of the final product.

For the microspheres component, I use thermoplastic, hollow spheres encapsulating a gas. When the microspheres are heated, the thermoplastic shell softens at the same time the gas increases its pressure, resulting in an expansion of the spheres. Different types of spheres are available, with expansion temperatures in the range of from about 80° C. to about 130° C.

I prefer EXPANCEL® 820 WU microspheres, available from CASCO NOBEL Industrial Products AB, Expancel Div., Marietta, Ga. They are available in fiber drums as a "wet cake" (solid content approx. 65 wt. %).

EXPANCEL® microspheres have an initial diameter of from about 9 to about 17 microns (based on volume average), and reach an average diameter of from about 40 to about 60 microns when expanded. The unexpanded microspheres have a true density of from about 1250 to about 1300 kg/m$^3$. When fully expanded, the true density of the microspheres drops to a level below about 20 kg/m$^3$, meaning that their volume has increased more than 50 times.

Optionally, my composition also comprises a hydrophobic silica component to further increase its hydrophobicity. I prefer AEROSIL® R 202 colloidal silicon dioxide available from DeGussa Corp., Dublin, Ohio.

To make my composition, I mix approximately equal parts by weight of corn syrup and hydrocarbon resin while heating the mixture to improve its blending characteristics. Then, I add from 1 to 20 parts by weight of hydrophobic silica to 100 parts of the sugar/resin blend, and mix with continued heating to obtain a gel which will accept and disperse the unexpanded microspheres.

I add the unexpanded microspheres to the gel in 1–20 parts by weight of the sugar/resin blend and mix them with continued heating to obtain a dense putty. Then, I place a small amount of the dense putty in the center of a marketable container approximately 3 times the volume of the dense putty, and I place the container in a conventional household microwave oven. Depending on sugar and microsphere content, the time necessary in the oven for full expansion of the microspheres is from about 15 to about 60 seconds on high power.

EXAMPLE I

| Sample | Grams | | |
|---|---|---|---|
| | A | B | C |
| Corn Syrup | 50 | 50 | 30 |
| Hydrocarbon Resin | 50 | 50 | 70 |
| Hydrophobic Silica | 6 | 6 | 6 |
| EXPANCEL ® Microspheres (60 wt. % solids in a water pack) | 7 | 10 | 7 |
| Microwave time in seconds to expand 15 grams in 2-½ oz. polyethylene container. | 15 | 30 | 60 |
| Density, grams/cc | 0.25 | 0.20 | 0.35 |

The resulting composition is a sticky, low density (0.35 g/cc optimum), moldable putty. The low density putty may be colored with fluorescent pigments. It is hydrophobic and shows very little weight gain (approximately 3%) in water after 10 days of floating. It adheres well to fishing leaders and can be repeatedly cast without falling off. Its very low density causes it to ride high in the water and to be very visible as a fish strike indicator. It is reusable and may be taken off the leader, replaced in its container and reused at another time. Its high sugar content should insure its biodegradability.

To use my invention, one simply pinches off with the fingers approximately one cubic centimeter of the low density putty (about ⅓ g.) from the container. Then, roll it like clay or dough between the fingers and palms to shape it into a strip. Then, wrap the strip tightly around the fishing line at the desired location above the fish hook to provide a buoyant and visible bobber there.

While there is shown and described the present preferred embodiment of the invention, it is to be distinctly understood that this invention is not limited thereto but may be variously embodied to practice within the scope of the following claims.

I claim:

1. A moldable, buoyant fish strike indicator material, comprising
   (a) a sugar component;
   (b) a resin component; and
   (c) a thermoplastic, hollow spheres component, said hollow spheres being present in from about 1 to about 20 parts by weight of 100 parts of the sum of the said sugar and said resin components, said hollow spheres having a average diameter of from about 9 to about 17 microns.

2. A moldable, buoyant fish strike indicator material, comprising
   (a) a sugar component;
   (b) a resin component; and
   (c) a thermoplastic, hollow spheres component, said hollow spheres being present in from about 1 to about 20 parts by weight of 100 parts of the sum of the said sugar and said resin components, said hollow spheres having a average diameter of from about 40 to about 60 microns.

3. The combination of a fish strike indicator material comprising
   (a) a sugar component;
   (b) a resin component;
   (c) a thermoplastic, hollow spheres component, said hollow spheres being present in from about 1 to about 20 parts by weight of 100 parts of the sum of the said sugar and said resin components, said hollow spheres having a average diameter of from about 40 to about 60 microns; and,
   a fishing line, wherein a piece of the fish strike indicator material is wrapped around the fishing line.

* * * * *